(No Model.)
J. STEVENS.
CUTTING NIPPERS.
No. 287,589. Patented Oct. 30, 1883.
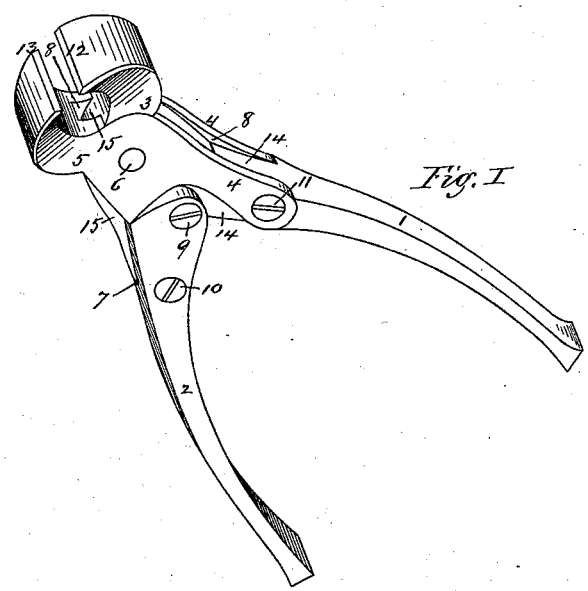
Fig. I
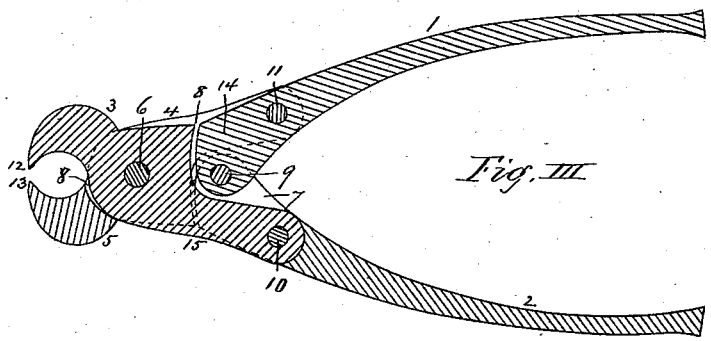
Fig. III
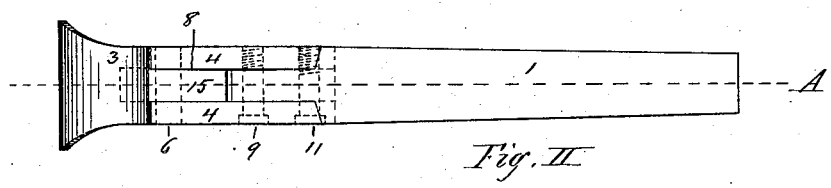
Fig. II
Witnesses.
N. E. Dwinnell.
Chas. H. Wood.
Inventor
Joshua Stevens.
By T. A. Curtis
his Atty.
N. PETERS. Photo-Lithographer. Washington, D. C.

UNITED STATES PATENT OFFICE.

JOSHUA STEVENS, OF CHICOPEE FALLS, MASSACHUSETTS.

CUTTING-NIPPERS.

SPECIFICATION forming part of Letters Patent No. 287,589, dated October 30, 1883.

Application filed October 12, 1882. (No model.)

*To all whom it may concern:*

Be it known that I, JOSHUA STEVENS, of Chicopee Falls, in the county of Hampden and State of Massachusetts, have invented a new and useful Improvement in Cutting-Nippers, of which the following is a specification and description.

The object of my invention is to provide cutting-nippers whose cutting-jaws are actuated by a compound leverage, or mechanism similar to that of a toggle-joint, to force the jaws together in cutting, and I accomplish this by the mechanism substantially as hereinafter described, and illustrated in the accompanying drawings, in which—

Figure I is a perspective view of my cutting-nippers, made according to my invention. Fig. II is an edge view of the same, and Fig. III is a sectional view at line A of Fig. II.

In the drawings, 1 and 2 represent the two handles of the nippers, which are pivoted together at 9, the pivoted end of one, as 2, being slotted, as at 7, and the other tongued or tenoned, as at 14, so that the latter may be inserted in the former to be pivoted.

The jaw 5 has a cutting-edge, 13, made on its outer end, and its inner portion is slotted, as at 8, forming two arms, as 4, whose extreme ends embrace the tongued portion of the handle 1 and are pivoted thereto at 11, and the jaw 3 has a similar cutting-edge, 12, made on its outer end, and its inner portion is tongued, as at 15, to pass between the arms 4 of the other jaw, 5, and enter the slotted portion 7 of the handle 2, where it is pivoted at 10, and these two jaws 3 and 5 are pivoted together at 6.

It will be seen that the handles 1 and 2 form two levers, pivoted together at 9, which is the fulcrum for both, that portion of one between the pivots 9 and 10 forming the short arm, and the remainder of the handle 2 the long arm, and that portion of the other handle between the pivots 9 and 11 forms the short arm and the remainder the long arm of the other lever. The jaws 3 and 5 also form two levers, that portion between the pivot 6 and the cutting-edge 13 forming the short arm of one and that portion between the pivots 6 and 11 the long arm, the part between the pivot 6 and the cutting-edge 12 forming the short arm of the other, the long arm of the latter being between the pivots 6 and 10.

By forcing the two handles 1 and 2 together, power is applied at the long arms of the levers forming the cutting-jaws, to operate in cutting the material placed between the cutting-edges 12 and 13, and the nearer together these cutting-edges are brought the nearer the pivots 10 and 11 approximate to a straight line with the pivots 6 and 9, and operate somewhat as a toggle-joint in giving increased power as the handles are brought nearer together.

Having thus described my invention, what I claim as new is—

The combination of the handles 1 and 2, pivoted together at 9, and the cutting-jaws 3 and 5, pivoted together at 6, and one jaw pivoted to one handle, as at 10, and the other jaw pivoted to the other handle, as at 11, substantially as described.

JOSHUA STEVENS.

Witnesses:
T. A. CURTIS,
N. E. DWINNELL.